(12) United States Patent
Febbo et al.

(10) Patent No.: US 12,291,233 B2
(45) Date of Patent: May 6, 2025

(54) SYSTEM AND METHOD FOR PROVIDING ACCURATE TRAJECTORY FOLLOWING FOR AUTOMATED VEHICLES IN DYNAMIC ENVIRONMENTS

(71) Applicant: Honda Motor Co., Ltd., Tokyo (JP)

(72) Inventors: Huckleberry Febbo, Los Gatos, CA (US); David Francis Isele, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 279 days.

(21) Appl. No.: 16/929,313

(22) Filed: Jul. 15, 2020

(65) Prior Publication Data

US 2021/0094569 A1    Apr. 1, 2021

Related U.S. Application Data

(60) Provisional application No. 62/907,328, filed on Sep. 27, 2019.

(51) Int. Cl.
*B60W 60/00* (2020.01)
*G01S 17/89* (2020.01)
(Continued)

(52) U.S. Cl.
CPC ......... *B60W 60/0011* (2020.02); *G01S 17/89* (2013.01); *G05D 1/0212* (2013.01);
(Continued)

(58) Field of Classification Search
CPC ......... B60W 60/0011; B60W 2554/20; B60W 2554/40; B60W 60/0013; B60W 2720/106; B60W 2720/125; B60W 2754/20; B60W 2754/30; B60W 2420/42; B60W 2420/52; G01S 17/89; G01S 17/87; G01S 17/931; G05D 1/0212; G05D 1/024; G05D 1/0248; G05D 2201/0213; G06V 20/58
See application file for complete search history.

(56) References Cited

U.S. PATENT DOCUMENTS 11,602,999 B1 *   3/2023   Flatland .............. G05D 1/0217
2015/0148924 A1 *   5/2015   Di Cairano ........... G05B 17/02
                                                            700/86

(Continued)

OTHER PUBLICATIONS

Fredlund et al., Autonomous driving using Model Predictive Control methods, Apr. 2017 (Year: 2017).*

(Continued)

*Primary Examiner* — Anne Marie Antonucci
*Assistant Examiner* — Connor L Knight
(74) *Attorney, Agent, or Firm* — Rankin, Hill & Clark LLP

(57) ABSTRACT

A system and method for providing accurate trajectory following for automated vehicles in dynamic environments that include receiving image data and LiDAR data associated with a dynamic environment of a vehicle. The system and method also include processing a planned trajectory of the vehicle that is based on an analysis of the image data and LiDAR data. The system and method further include communicating control signals associated with following the planned trajectory to autonomously control the vehicle to follow the planned trajectory to navigate within the dynamic environment to reach a goal.

20 Claims, 5 Drawing Sheets

(51) Int. Cl.
  G05D 1/00 (2006.01)
  G05D 1/02 (2020.01)
  G06K 9/00 (2022.01)
  G06V 20/58 (2022.01)
(52) U.S. Cl.
  CPC ............. *G05D 1/024* (2013.01); *G06V 20/58* (2022.01); *B60W 2554/20* (2020.02); *B60W 2554/40* (2020.02)

(56) References Cited

U.S. PATENT DOCUMENTS

| | | | | |
|---|---|---|---|---|
| 2018/0164827 | A1* | 6/2018 | Chu | G01C 21/3446 |
| 2018/0196439 | A1* | 7/2018 | Levinson | G05D 1/0088 |
| 2019/0155229 | A1* | 5/2019 | Herrera | B60W 50/00 |
| 2019/0250609 | A1* | 8/2019 | Luo | G05D 1/0088 |
| 2020/0050196 | A1* | 2/2020 | Liao-McPherson | G05B 13/048 |
| 2020/0174483 | A1* | 6/2020 | Cheon | G05D 1/0214 |
| 2020/0216064 | A1* | 7/2020 | du Toit | B60W 30/18163 |
| 2020/0233414 | A1* | 7/2020 | Akella | G06V 20/584 |
| 2020/0233415 | A1* | 7/2020 | Panzica | G01C 21/3461 |
| 2020/0293009 | A1* | 9/2020 | Quirynen | B60W 50/0097 |
| 2020/0353917 | A1* | 11/2020 | Leitermann | B60W 60/00272 |
| 2020/0363806 | A1* | 11/2020 | Kobilarov | G06V 20/56 |
| 2020/0379461 | A1* | 12/2020 | Singh | G05D 1/0088 |
| 2021/0064042 | A1* | 3/2021 | Matsuda | B62D 15/025 |
| 2021/0163068 | A1* | 6/2021 | Zhu | B62D 15/0285 |
| 2022/0026910 | A1* | 1/2022 | Liu | G05D 1/0217 |
| 2022/0371594 | A1* | 11/2022 | Raffone | B60W 60/0011 |

OTHER PUBLICATIONS

Liu et al., A Nonlinear Model Predictive Control Algorithm for Obstacle Avoidance in Autonomous Ground Vehicles within Unknown Environments, Apr. 24, 2015 (Year: 2015).*
John T Betts. Practical methods for optimal control and estimation using nonlinear programming, vol. 19. Siam, 2010.
Huckleberry Febbo, Jiechao Liu, Paramsothy Jayakumar, Jeffrey L Stein, and Tulga Ersal. Moving obstacle avoidance for large, high-speed autonomous ground vehicles. In American Control Conference, pp. 5568-5573, 2017.
J Gonzales, F Zhang, K Li, and F Borrelli. Autonomous drifting with onboard sensors. In Advanced Vehicle Control, p. 133. CRC Press, 2016.
Andrew Gray, Yiqi Gao, Theresa Lin, J. Karl Hedrick, H. Eric Tseng, and Francesco Borrelli. Predictive control for agile semi-autonomous ground vehicles using motion primitives. Proceedings of the American Control Conference, pp. 4239-4244, 2012.
Jiechao Liu, Paramsothy Jayakumar, Jeffrey L Stein, and Tulga Ersal. Combined speed and steering control in high-speed autonomous ground vehicles for obstacle avoidance using model predictive control. IEEE Transactions on Vehicular Technology, 66(10):8746-8763, 2017.
Rajesh Rajamani. Vehicle dynamics and control. Springer Science and Business Media, 2011.
Joel Andersson, Johan A° kesson, and Moritz Diehl. Casadi: A symbolic package for automatic differentiation and optimal control. In Recent Advances in Algorithmic Differentiation, pp. 297-307. Springer, 2012.
G Basset, Yunjun Xu, and OA Yakimenko. Computing short-time aircraft maneuvers using direct methods. Journal of Computer and Systems Sciences International, 49(3):481-513, 2010.
Jeff Bezanson, Stefan Karpinski, Viral B Shah, and Alan Edelman. Julia: A fast dynamic language for technical computing. arXiv preprint arXiv: 1209.5145, 2012.
Iain Dunning, Joey Huchette, and Miles Lubin. Jump: A modeling language for mathematical optimization. SIAM Review, 59(2):295-320, 2017.
P. Falcone, F. Borrelli, H. E. Tseng, J. Asgari, and D. Hrovat. A hierarchical model predictive control framework for autonomous ground vehicles. Proceedings of the American Control Conference, pp. 3719-3724, 2008.
Huckleberry Febbo. NLOptControl. https://github.com/ JuliaMPC/ NLOptControl.jl, 2017.
Huckleberry Febbo. Real-time Trajectory Planning to Enable Safe and Performant Automated Vehicles Operating in Unknown Dynamic Environments. PhD thesis, 2019.
Janick V Frasch, Andrew Gray, Mario Zanon, Hans Joachim Ferreau, Sebastian Sager, Francesco Borrelli, and Moritz Diehl. An auto-generated nonlinear mpc algorithm for real-time obstacle avoidance of ground vehicles. In 2013 European Control Conference (ECC), pp. 4136-4141. IEEE, 2013.
Emilio Frazzoli, Munther A Dahleh, and Eric Feron. Real-time motion planning for agile autonomous vehicles. Journal of guidance, control, and dynamics, 25(1):116-129, 2002.
Joseph Funke, Matthew Brown, Stephen M. Erlien, and J. Christian Gerdes. Collision Avoidance and Stabilization for Autonomous Vehicles in Emergency Scenarios. IEEE Transactions on Control Systems Technology, 25(4):1204-1216, 2017.
Yiqi Gao, Theresa Lin, Francesco Borrelli, Eric Tseng, and Davor Hrovat. Predictive Control of Autonomous Ground Vehicles With Obstacle Avoidance on Slippery Roads. pp. 265-272, 2011.
Jarrett Revels. Reversediff. https://github.com/ JuliaDiff/ReverseDiff. jl, 2017.
Andreas Griewank, David Juedes, and Jean Utke. Algorithm 755: Adol-c: a package for the automatic differentiation of algorithms written in c/c++. ACM Transactions on Mathematical Software (TOMS), 22(2):131-167, 1996.
Boris Houska, Hans Joachim Ferreau, and Moritz Diehl. ACADO toolkit: An open-source framework for automatic control and dynamic optimization. Optimal Control Applications and Methods, 32(3):298-312, 2011.
Christos Katrakazas, Mohammed Quddus, Wen Hua Chen, and Lipika Deka. Real-time motion planning methods for autonomous on-road driving: State-of-the-art and future research directions. Transportation Research Part C: Emerging Technologies, 60:416-442, 2015.
Jason Kong, Mark Pfeiffer, Georg Schildbach, and Francesco Borrelli. Kinematic and dynamic vehicle models for autonomous driving control design. IEEE Intelligent Vehicles Symposium, Proceedings, Aug. 2015: 1094-1099, 2015.
Alexander Liniger, Alexander Domahidi, and Manfred Morari. Optimization-based autonomous racing of 1:43 scale RC cars. Optimal Control Applications and Methods, 36(5):628-647, 2015.
Jiechao Liu, Paramsothy Jayakumar, Jeffrey L Stein, and Tulga Ersal. A study on model fidelity for model predictive control-based obstacle avoidance in high-speed autonomous ground vehicles. Vehicle System Dynamics, 54(11):1629-1650, 2016.

* cited by examiner

SYSTEM AND METHOD FOR PROVIDING ACCURATE TRAJECTORY FOLLOWING FOR AUTOMATED VEHICLES IN DYNAMIC ENVIRONMENTS

CROSS-REFERENCE TO RELATED APPLICATION

This application claims priority to U.S. Provisional Application Ser. No. 62/907,328 filed on Sep. 27, 2019, which is expressly incorporated herein by reference.

BACKGROUND

Controlling automated vehicles to accurately follow dynamic references trajectories is a challenging and important problem. In many instances controlling automated vehicles to follow dynamic reference trajectories may result in conflicting terms, model mismatch, computational delays, and control delays that may lead to an excessive divergence from a normal state trajectory. This divergence may impede effective operation of automated vehicles in dynamically changing environments in which the automated vehicles may encounter various obstacles as the vehicles are being operated in real time.

BRIEF DESCRIPTION

According to one aspect, a computer-implemented method for providing accurate trajectory following for automated vehicles in dynamic environments that includes receiving image data and LiDAR data associated with a dynamic environment of a vehicle. The computer-implemented method also includes processing a planned trajectory of the vehicle that is based on an analysis of the image data and LiDAR data. The computer-implemented method further includes communicating control signals associated with following the planned trajectory to autonomously control the vehicle to follow the planned trajectory to navigate within the dynamic environment to reach a goal. A predictive optimal control problem is executed to determine the control signals that are to be communicated to autonomously control the vehicle to follow the planned trajectory.

According to another aspect, a system for providing accurate trajectory following for automated vehicles in dynamic environments that includes a memory storing instructions when executed by a processor cause the processor to receive image data and LiDAR data associated with a dynamic environment of a vehicle. The instructions also cause the processor to process a planned trajectory of the vehicle that is based on an analysis of the image data and LiDAR data. The instructions further cause the processor to communicate control signals associated with following the planned trajectory to autonomously control the vehicle to follow the planned trajectory to navigate within the dynamic environment to reach a goal. A predictive optimal control problem is executed to determine the control signals that are to be communicated to autonomously control the vehicle to follow the planned trajectory.

According to yet another aspect, a non-transitory computer readable storage medium storing instructions that when executed by a computer, which includes a processor perform a method that includes receiving image data and LiDAR data associated with a dynamic environment of a vehicle. The method also includes processing a planned trajectory of the vehicle that is based on an analysis of the image data and LiDAR data. The method further includes communicating control signals associated with following the planned trajectory to autonomously control the vehicle to follow the planned trajectory to navigate within the dynamic environment to reach a goal. A predictive optimal control problem is executed to determine the control signals that are to be communicated to autonomously control the vehicle to follow the planned trajectory.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
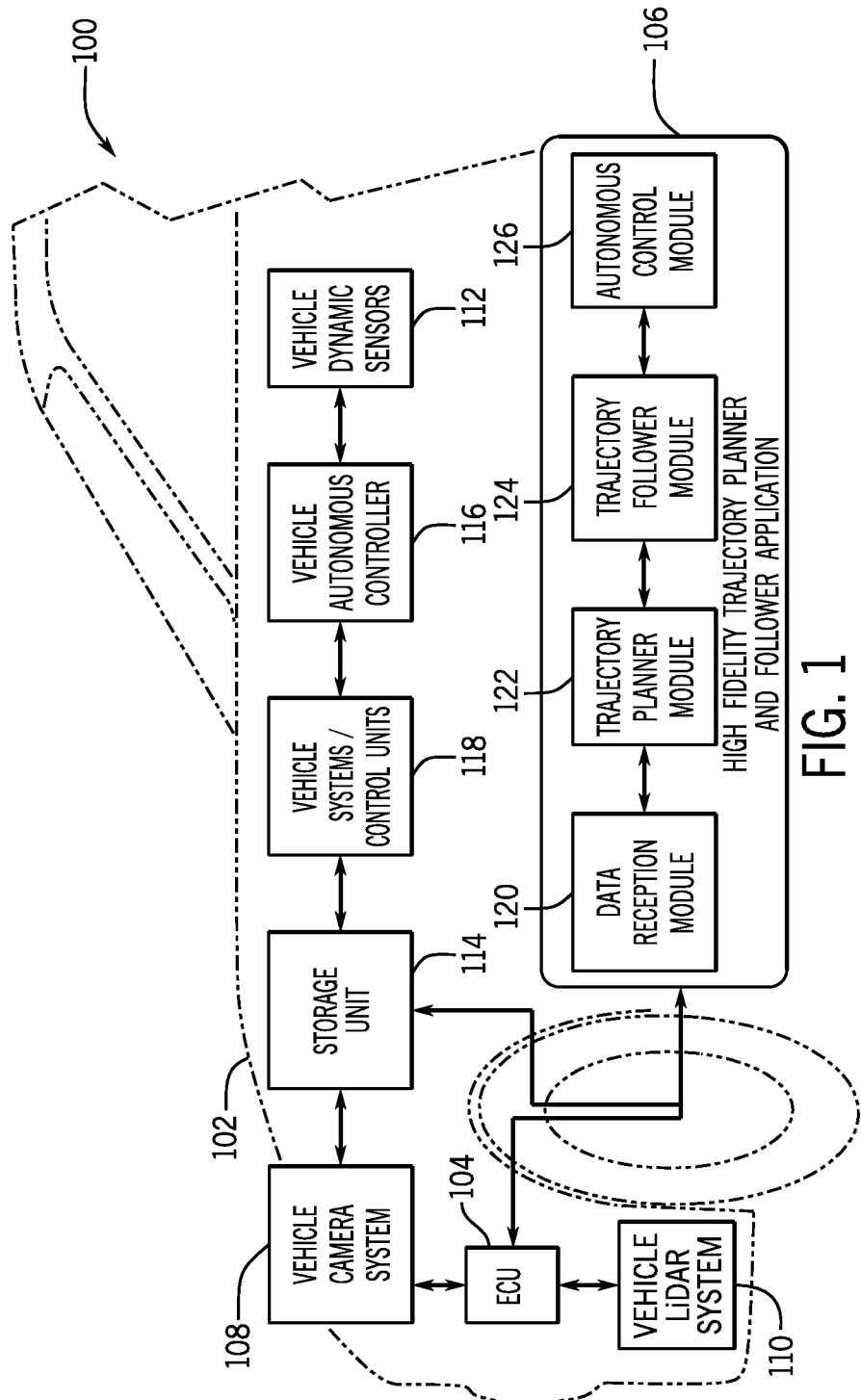
FIG. 1 is a schematic view of an exemplary system for implementing systems and methods for providing accurate trajectory following for automated vehicles in dynamic environments according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary system 100 for implementing systems and methods for providing accurate trajectory following for automated vehicles in dynamic environments according to an exemplary embodiment of the present disclosure. The components of the system 100, as well as the components of other systems, hardware architectures, and software architectures discussed herein, may be combined, omitted, or organized into different architectures for various embodiments.

Generally the system includes a vehicle 102 that includes an electronic control unit (ECU) 104 that executes one or more applications, operating systems, vehicle system and subsystem user interfaces, among others. The ECU 104 may also execute a high fidelity trajectory planner and follower application (trajectory follower application) 106 that may be configured to provide accurate trajectory following for automated vehicles in dynamic environments. As discussed below, the trajectory follower application 106 may be configured to receive data associated with a dynamic environment (shown in FIG. 2) in which the vehicle 102 is operating and traveling and a goal that may associated with an individual or additional vehicle that is to be followed/reached by the vehicle 102.

The trajectory follower application 106 may be configured to determine and classify one or more obstacles that may be included within a pathway of the vehicle 102 that may be included within the dynamic environment. The application 106 may be configured to utilize to further classify the one or more obstacles as dynamic obstacles and/or static obstacles. In one embodiment, the location of the obstacles, distance of the obstacles with respect to a position of the vehicle 102, a configuration of the pathway on which the vehicle 102 is traveling, and the location of the goal with reference to the vehicle 102 may be analyzed to thereby process a planned trajectory of the vehicle 102.

The planned trajectory may be a trajectory that is utilized to effectively follow and/or reach the goal while independently navigating through the dynamic environment without any overlap with a current or perspective location of one or more obstacles that are included within the dynamic environment. The planned trajectory may be output to allow effective route planning to reach a location of the goal while simultaneously optimizing speed and steering, minimizing control effort associated with autonomous dynamic parameters of the vehicle 102 while minimizing a time to reach the goal.

As discussed in more detail below, the trajectory follower application 106 may be configured to process a predictive control-based algorithm for trajectory following that is based on the planned trajectory that is output by the application 106 based on the location of the obstacles, distance of the obstacles with respect to a position of the vehicle 102, and a configuration of the pathway on which the vehicle 102. The trajectory follower application 106 may be configured to receive data associated with a real time dynamic operation of the vehicle 102 as it is being operated within the dynamic environment to determine dynamic constraints associated with the vehicle 102. The application 106 may thereby autonomously control the vehicle 102 to follow planned state trajectories accurately within the dynamic constraints. Accordingly, the vehicle 102 may be operated to follow the planned trajectory to allow avoidance of overlap between the path of the vehicle 102 and objects that may be located within the dynamic environment.

Figure 2:
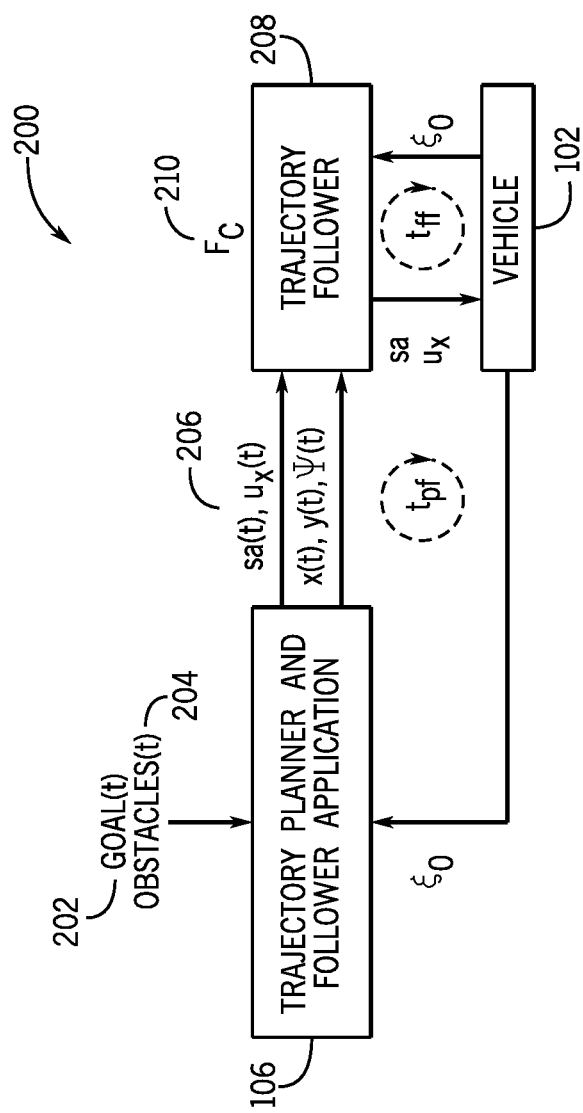
FIG. 2 is an overview of a control framework utilized by trajectory follower application according to an exemplary embodiment of the present disclosure.

With reference to FIG. 2, an overview of a control framework 200 utilized by trajectory follower application 106 according to an exemplary embodiment, the trajectory follower application 106 may be configured to receive the goal 202 (e.g., person/additional vehicle to be followed/reached) of the vehicle 102. The goal 202 may be determined based on external data that may be sent to the application 106 by one or more systems of the vehicle 102. For example, a vehicle camera system 108 and/or a vehicle LiDAR system 110 may provide data associated with the goal 202 to be followed/reached by the vehicle 102 in the dynamic environment. In an alternate embodiment, additional systems of the vehicle 102 may receive signals associated with a position and/or location of the goal 202. Such signals may be included as electronic data signals that are wirelessly communicated to the vehicle 102 (e.g., through a telematics control unit (not shown)).

The trajectory follower application 106 may additionally determine obstacles 204 that may be based on image data that is provided by the vehicle camera system 108 and/or LiDAR data that is provided by a vehicle LiDAR system 110. As discussed below, the vehicle camera system 108 and the vehicle LiDAR system 110 may provide data associated with static obstacles, dynamic obstacles, and/or the pathway on which the vehicle 102 is traveling within the dynamic environment. The trajectory follower application 106 may be configured to analyze the goals 202 and determine control signals 206 that are to be communicated to follow the planned trajectory to follow and/or reach the goal 202 in an effective manner that avoids overlap with the dynamic objects and/or static objects that are located within the dynamic environment.

In one embodiment, the trajectory follower application 106 may execute a trajectory follower function 208 that may utilize the control signals 206 associated with the planned trajectory as a constant reference control trajectory to be tracked and followed. The application 106 may thereby execute a predicted control-based algorithm Fc 210 (discussed in more detail below). The algorithm Fc 210 may incorporate both a planned state and control trajectories into its cost functional. Accordingly, the algorithm Fc 210 may be configured to output autonomous control commands to the vehicle 102 to autonomously operate to effectively follow and/or reach its goal 202 within the dynamic environment by following the planned trajectory.

With continued reference to FIG. 1, the ECU 104 may be configured to be operably connected to a plurality of additional components of the vehicle 102, including the vehicle camera system 108, the vehicle LiDAR system 110, vehicle dynamic sensors 112, a storage unit 114, a vehicle autonomous controller 116, and vehicle systems/control units 118 of the vehicle 102. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the vehicle 102.

The ECU 104 may also include a communication device (not shown) for sending data internally within (e.g., between one or more components) the vehicle 102 and communicating with externally hosted computing systems (e.g., external to the vehicle 102). Generally, the ECU 104 may communicate with the storage unit 114 to execute the one or more applications, operating systems, vehicle system and subsystem user interfaces, and the like that are stored within the storage unit 114.

In one embodiment, the ECU 104 may communicate with the vehicle autonomous controller 116 to execute autonomous driving commands to operate the vehicle 102 to be fully autonomously driven or semi-autonomously driven in a particular manner. As discussed below, the autonomous driving commands may be based on commands associated with the trajectory follower function 208 of the trajectory follower application 106 to follow the planned trajectory output by the application 106.

As discussed below, based on one or more executable command instructions that may be communicated by the application 106, the vehicle autonomous controller 116 may be configured to autonomously control the vehicle 102 to operate in a manner based on the one or more commands that are output by the application 106. For example, the trajectory follower application 106 may send commands to the vehicle autonomous controller 116 to ensure that the vehicle 102 is autonomously operated to complete acceleration, braking, and/or steering in a way that minimizes control effort and a time to the goal 202.

In one or more embodiments, the vehicle autonomous controller 116 may autonomously control the operation of the vehicle 102 by providing one or more commands to one or more of the vehicle systems/control units 118 to provide full autonomous or semi-autonomous control of the vehicle 102 to follow the planned trajectory output by the application 106. Such autonomous control of the vehicle 102 may be provided by sending one or more commands to control one or more of the vehicle systems/control units 118 to operate (e.g., drive) the vehicle 102 during one or more circumstances (e.g., when providing driver assist controls), and/or to fully control driving of the vehicle 102.

The one or more commands may be provided to one or more vehicle systems/control units 118 that include, but are not limited to an engine control unit, a braking control unit, a transmission control unit, a steering control unit, and the like to control the vehicle 102 to be autonomously driven based on one or more autonomous commands that are output by the trajectory follower application 106 based on the control signals associated with the planned trajectory to reach its goal 202.

In one or more embodiments, the vehicle systems/control units 118 may be operably connected to the vehicle dynamic sensors 112 of the vehicle 102. The vehicle dynamic sensors 112 may be configured to receive inputs from one or more vehicle systems, sub-systems, control systems, and the like. In one embodiment, the vehicle dynamic sensors 112 may be included as part of a Controller Area Network (CAN) of the vehicle 102 and may be configured to provide vehicle dynamic data to the ECU 104 to be utilized for one or more vehicle systems, sub-systems, control systems, and the like. The vehicle dynamic sensors 112 may include, but may not be limited to, position sensors, heading sensors, speed sensors, steering speed sensors, steering angle sensors, throttle angle sensors, accelerometers, magnetometers, gyroscopes, yaw rate sensors, brake force sensors, wheel speed sensors, wheel turning angle sensors, transmission gear sensors, temperature sensors, RPM sensors, GPS/DGPS sensors, and the like (individual sensors not shown).

In one configuration, the vehicle dynamic sensors 112 may provide dynamic data in the form of one or more values (e.g., numeric levels) that are associated with the real-time dynamic performance of the vehicle 102 as one or more driving maneuvers are conducted and/or as the vehicle 102 is controlled to be autonomously driven. As discussed below, dynamic data that is output by the vehicle dynamic sensors 112 may be associated with a real time dynamic operation of the vehicle 102 as it is traveling within the dynamic environment. The dynamic data may be analyzed by the trajectory follower application 106 to determine dynamic constraints associated with the vehicle 102 to thereby autonomously control the vehicle 102 to operate based on such constraints. The dynamic constraints may pertain to static forbidden regions of state-time space that are based on the dynamic operation of the vehicle 102. For example, the dynamic constraints may pertain to physical constraints that may be placed upon the dynamic operation of the vehicle 102. Such physical constraints may be based on the real-time speed, acceleration, turning angle, length of the vehicle 102, weight of the vehicle 102, width of the vehicle 102, and the like of the vehicle 102 as the vehicle 102 traveling within the dynamic environment.

In one or more embodiments, the storage unit 114 of the vehicle 102 may be configured to store one or more executable files associated with one or more operating systems, applications, associated operating system data, application data, vehicle system and subsystem user interface data, and the like that are executed by the ECU 104. In one or more embodiments, the storage unit 114 may be accessed by the trajectory follower application 106 to store data that is associated with one or more object classifiers that may analyzed to classify one or more obstacles as dynamic obstacles and/or static obstacles. For example, the data associated with the one or more object classifiers may be analyzed to classify additional vehicles and pedestrians that are potential obstacles to the vehicle 102 within the dynamic environment as dynamic obstacles. Additionally, the data associated with the one or more object classifiers may be analyzed to classify traffic cones and lamp posts that are potential obstacles to the vehicle 102 in the dynamic environment as static obstacles.

With continued reference to FIG. 1, the vehicle camera system 108 may include one or more of the cameras (not shown) that may be positioned in one or more directions and at one or more areas to capture one or more images of the surrounding environment of the vehicle 102 (e.g., images of the roadway on which the vehicle 102 is traveling). The one or more cameras of the vehicle camera system 108 may be disposed at external front portions of the vehicle 102, including, but not limited to different portions of a vehicle dashboard, a vehicle bumper, vehicle front lighting units, vehicle fenders, and a vehicle windshield. In one embodiment, the one or more cameras may be configured as RGB cameras that may capture RGB bands that are configured to capture rich information about object appearance, as well as relationships and interactions between the vehicle 102 and objects within the surrounding environment of the vehicle 102.

In other embodiments, the one or more cameras may be configured as stereoscopic cameras that are configured to capture environmental information in the form three-dimensional images. In one or more configurations, the one or more cameras may be configured to capture one or more first person viewpoint RGB images/videos of the dynamic environment. The vehicle camera system 108 may be configured to convert one or more RGB images/videos (e.g., sequences of images) into image data that is communicated to the trajectory follower application 106 to be analyzed.

In an exemplary embodiment, the vehicle LiDAR system 110 may be operably connected to a plurality of LiDAR sensors (not shown). In particular, the vehicle LiDAR system 110 may include one or more planar sweep lasers that include respective three-dimensional LiDAR sensors that may be configured to oscillate and emit one or more laser beams of ultraviolet, visible, or near infrared light toward the scene of the surrounding environment of the vehicle 102. The plurality of LiDAR sensors may be configured to receive one or more reflected laser waves (e.g., signals) that are reflected off one or more objects such as surrounding vehicles located within the surrounding environment of the vehicle 102. In other words, upon transmitting the one or more laser beams to the dynamic environment, the one or more laser beams may be reflected as laser waves by one or more obstacles that include static objects and/or dynamic objects that may be located within the surrounding environment of the vehicle 102 at one or more points in time.

In one embodiment, each of the plurality of LiDAR sensors may be configured to analyze the reflected laser waves and output respective LiDAR data to the trajectory follower application 106. The LiDAR data may include LiDAR coordinates that may be associated with the locations, positions, depths, and/or dimensions (e.g., measurements) of one or more dynamic objects such as the surrounding vehicles and pedestrians that may be located within the dynamic environment.

As discussed below, image data provided by the vehicle camera system 108 and/or the LiDAR data provided by the vehicle LiDAR system 110 may be communicated to the trajectory follower application 106 to be analyzed against the one or more object classifiers stored on the storage unit 114 to classify static objects and dynamic objects located within the dynamic environment. Additionally, the image data provided by the vehicle camera system 108 and/or the LiDAR data provided by the vehicle LiDAR system 110 may be analyzed to determine the locations of the static objects and dynamic objects with respect to the location of the vehicle 102. Accordingly, the trajectory follower application 106 may plan the trajectory of the vehicle 102 to avoid overlap with the static objects and the dynamic objects classified and located within the dynamic environment.

II. The High Fidelity Trajectory Planner and Follower Application and Related Methods Components of the trajectory follower application 106 will now be described according to an exemplary embodiment and with reference to FIG. 1 and FIG. 2. In an exemplary embodiment, the trajectory follower application 106 may be stored on the storage unit 114 and executed by the ECU 104 of the vehicle 102. In another embodiment, the trajectory follower application 106 may be stored on an externally hosted computing infrastructure and may be accessed by the telematics control unit of the vehicle 102 to be executed by the ECU 104 of the vehicle 102.

The general functionality of the trajectory follower application 106 will now be discussed. In an exemplary embodiment, the trajectory follower application 106 may include a plurality of modules 120-126 that may be configured to provide accurate trajectory following for automated vehicles in dynamic environments. The plurality of modules 120-126 may include a data reception module 120, a trajectory planner module 122, a trajectory follower module 124, and an autonomous control module 126. However, it is appreciated that the trajectory follower application 106 may include one or more additional modules and/or sub-modules that are included in lieu of the modules 120-126.

Figure 3:
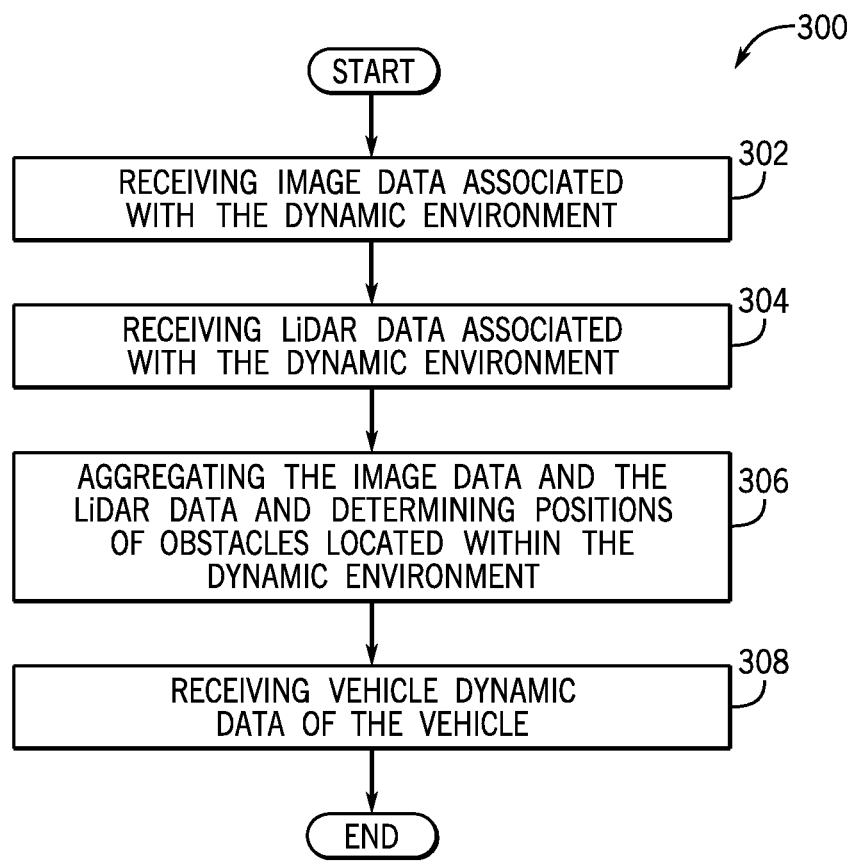
FIG. 3 is a process flow diagram of a method for receiving data associated with the dynamic environment and the dynamic operation of the vehicle according to an exemplary embodiment of the present disclosure.

FIG. 3 is a process flow diagram of a method 300 for receiving data associated with the dynamic environment and the dynamic operation of the vehicle 102 according to an exemplary embodiment of the present disclosure. FIG. 3 will be described with reference to the components of FIG. 1 and FIG. 2 though it is to be appreciated that the method 300 of FIG. 3 may be used with other systems/components. The method 300 may begin at block 302, wherein the method 300 may include receiving image data associated with the dynamic environment.

In an exemplary embodiment, the data reception module 120 may be configured to receive environmental data that may be associated with the dynamic environment in which the vehicle 102 is traveling in the form of image data that may be provided by the vehicle camera system 108 of the vehicle 102. As discussed above, the image data may pertain to one or more RGB images/video of the surrounding static objects and dynamic objects that are located within the dynamic environment that are captured by one or more cameras that are operably connected to the vehicle camera system 108. In some embodiments, the data reception module 128 may package and store the image data on the storage unit 114 to be evaluated at one or more points in time.

The method 300 may proceed to block 304, wherein the method 300 includes receiving LiDAR data associated with the surrounding environment of the vehicle 102. In an exemplary embodiment, the data reception module 120 may be configured to receive the environmental data in the form of LiDAR data that may be provided by the vehicle LiDAR system 110 and may be associated with the one or more reflected laser waves. In other words, the LiDAR data may include LiDAR based observations associated with static objects and dynamic objects that may be located within the surrounding environment of the vehicle 102. In some embodiments, the data reception module 120 may package and store the LiDAR data on the storage unit 114 to be evaluated at one or more points in time.

The method 300 may proceed to block 306, wherein the method 300 may include aggregating the image data and the LiDAR data and determining positions of obstacles located within the dynamic environment. In an exemplary embodiment, the data reception module 120 may be configured to analyze the image data and the LiDAR data to determine data points that correspond to one or more particular obstacles that may be located on a pathway on which the vehicle 102 is traveling within the dynamic environment. Such corresponding data points may be based on one or more cameras and one or more LiDAR sensors that may be disposed at one or more corresponding portions of the vehicle 102, one or more cameras, and one or more LiDAR sensors that may be capturing data associated with one or more consistent directions associated with the dynamic environment, and/or one or more static objects and dynamic objects that may be included within captured data points within the image data and the LiDAR data at one or more simultaneous time steps.

In one embodiment, upon aggregating the image data and the LiDAR data, the data reception module 120 may be configured to communicate the aggregated image data and LiDAR data to the trajectory planner module 122 of the trajectory follower application 106. As discussed below, the trajectory planner module 122 may analyze the aggregated image data and LiDAR data to determine a planned trajectory to be followed by the vehicle 102.

The method 300 may proceed to block 308, wherein the method 300 may include receiving vehicle dynamic data of the vehicle 102. In an exemplary embodiment, the data reception module 120 may be configured to communicate with the vehicle dynamic sensors 112 of the vehicle 102 to receive real-time vehicle dynamic data that is associated with a plurality of vehicle dynamic parameters. The real-time vehicle dynamic data may include, but may not be limited to data that pertains to a current position of the vehicle 102, a current heading of the vehicle 102, a current velocity of the vehicle 102, a current steering angle of a steering of the vehicle 102, a current steering speed associated with the steering of the vehicle 102, a current throttle angle of a throttle of the vehicle 102, a current acceleration of the vehicle 102, a current yaw rate of the vehicle 102, a current brake force associated with the brakes of the vehicle 102, a current transmission gear of the vehicle 102, a current geo-location of the vehicle 102, a width of the vehicle 102, a weight of the vehicle 102, a height of the vehicle 102, and the like.

In one embodiment, upon receiving the vehicle dynamic data, the data reception module 120 may be configured to communicate the vehicle dynamic data to the trajectory follower module 124 of the trajectory follower application 106. As discussed below, the trajectory follower module 124 may be configured to determine dynamic constraints of the vehicle 102 based on the vehicle dynamic data.

Figure 4:
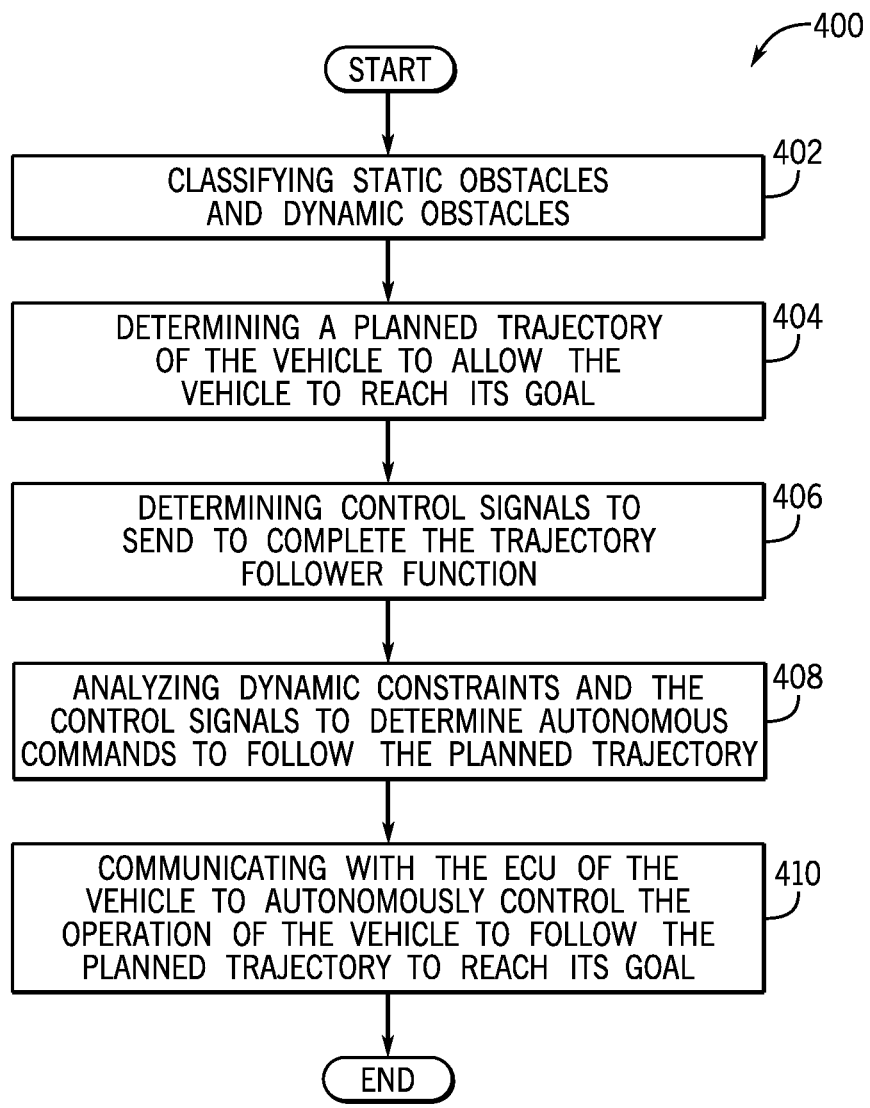
FIG. 4 is a process flow diagram of a method for determining a planned trajectory and control signals to complete trajectory following of the planned trajectory according to an exemplary embodiment of the present disclosure.

FIG. 4 is a process flow diagram of a method 400 for determining a planned trajectory and control signals to complete trajectory following of the planned trajectory according to an exemplary embodiment of the present disclosure. FIG. 4 will be described with reference to the components of FIG. 1 and FIG. 2 though it is to be appreciated that the method 400 of FIG. 4 may be used with other systems/components. The method 400 may begin at block 402, wherein the method 400 may include classifying static obstacles and dynamic obstacles.

As discussed above, upon aggregating the image data and the LiDAR data, the data reception module 120 may be configured to communicate the aggregated image data and LiDAR data to the trajectory planner module 122. The trajectory planner module 122 may access the storage unit 114 to analyze the one or more object classifiers that are stored on the storage unit 114. In particular, the one or more object classifiers may be analyzed to classify one or more objects that are located on the pathway of the vehicle 102 within the dynamic environment as dynamic obstacles and/or static obstacles. The data associated with the one or more object classifiers may be analyzed to classify additional vehicles and pedestrians that are potential obstacles to the vehicle 102 within the dynamic environment as dynamic obstacles. Additionally, the data associated with the one or more object classifiers may be analyzed to classify traffic cones and lamp posts that are potential obstacles to the vehicle 102 in the dynamic environment as static obstacles.

The method 400 may proceed to block 404, wherein the method 400 may include determining a planned trajectory of the vehicle 102 to allow the vehicle 102 to reach its goal 202. In an exemplary embodiment, the trajectory planner module 122 may analyze the location of the static obstacles and the location and dynamic position of the dynamic obstacles. The trajectory planner module 122 may also analyze the distance of the static obstacles and the dynamic obstacles with respect to a dynamic position of the vehicle 102, a configuration of the pathway on which the vehicle 102 is traveling within the dynamic environment, and the location of the goal 202 with respect to the location of vehicle 102 to thereby process a planned trajectory of the vehicle 102.

In one embodiment, the trajectory planner module 122 may ensure that the state and control trajectories are optimized such that these trajectories are available for the trajectory follower module 124. Additionally, the trajectory planner module 122 may ensure that its prediction horizon with respect to processing the planned trajectory is larger than the prediction horizon of the trajectory follower function 208. The planned trajectory may be output to allow effective route planning to reach a location of the goal 202 while simultaneously optimizing speed and steering, minimizing control effort associated with autonomous dynamic parameters of the vehicle 102, and minimize a time to reach the goal. Additionally, the planned trajectory may account for vehicle kinematics and simultaneously optimize the speed of the vehicle 102 and steering of the vehicle 102. Upon determining the planned trajectory of the vehicle 102, the trajectory follower module 124 may be configured to communicate respective data to the trajectory follower module 124. The planned trajectory may accordingly include a trajectory that is utilized to effectively follow and/or reach the goal 202 while independently navigating through the dynamic environment without any overlap with a current or perspective location of one or more obstacles that are included within the dynamic environment.

The method 400 may proceed to block 406, wherein the method 400 may include determining control signals to send to complete the trajectory follower function. In an exemplary embodiment, the trajectory follower module 124 may be configured to execute a trajectory planning algorithm to determine the control signals to be utilized to send one or more autonomous commands to the vehicle 102 to follow the planned trajectory. In an exemplary embodiment, the reference trajectories, which are provided by the planning algorithm, are sampled at N evenly spaced points $\in [t_c, t_f]$, where $t_c$ is the current time. This sampling generates the reference trajectory matrices for the state and control, which are denoted as $\xi^r_{n_{ct} \times N}$ and $\zeta^r_{n_{ctr} \times N}$, respectively.

$n_{st}$ and $n_{ctr}$ are the number of states and controls, respectively. For shorthand, $\xi^r[i]$ and $\zeta^r[i]$ access the $i^{th}$ point in these sampled state and control trajectories, respectively. For instance, $\xi^r[1]$ and $\xi^r[N]$ access the values of the initial and final states in the reference trajectory, respectively. The optimal control problem for the trajectory follower function 208 of the application 106 is given as:

$$\text{minimize}_{\xi,\zeta,\zeta_s} \sum_{i=1}^{N+1} [w_\xi(\xi[i] - \xi^r[i])^2] + \quad (1)$$

$$\sum_{i=1}^{N} [w_\zeta(\zeta[i] - \zeta^r[i])^2 + w_{ce}\zeta[i]^2 + w_s\zeta_s[i]^2] +$$

$$\sum_{i=1}^{N-1} [w_{a_x}(a_x[i+1] - a_x[i])^2]$$

subject to $$\xi[i+1] = \xi[i] + f(\xi[i], \zeta[i])t_s, \, i \in [1, \ldots, N] \quad (2)$$

$$\xi[1] = \xi_0 \quad (3)$$

$$\zeta_{min} \leq \zeta[i] \leq \zeta_{max}, \, i \in [1, \ldots N] \quad (4)$$

$$\dot{\zeta}_{min} \leq \frac{\zeta[i+1] - \zeta[i] + \zeta_s[i]}{t_s}, \, i \in [1, \ldots, N-1] \quad (5)$$

$$\dot{\zeta}_{max} \geq \frac{\zeta[i+1] - \zeta[i] - \zeta_s[i]}{t_s}, \, i \in [1, \ldots, N-1] \quad (6)$$

where $\zeta_{sn_{ctr} \times N}$ a matrix of slack variables on the controls that are added to provide rate constraints on the control variables, $\xi_{n_{st} \times N+1}$ and $\zeta_{n_{ctr} \times N}$ are the state and control discretization matrices, $w_\xi$, $w_\zeta$, $w_{ce}$, $w_s$ are arrays of constant weights, $w_{a_x}$ is a constant weight, and $a_x[i]$ is the $i^{th}$ element in the follower's longitudinal acceleration control trajectory. The dynamic constraints are given by f: $\mathbb{R}^{n_{st}} \times \mathbb{R}^{n_{ctr}} \to \mathbb{R}^{n_{st}}$. $\xi_0$ is the desired initial state vector, $\zeta_{min}$ and $\zeta_{max}$ are arrays of constant lower and upper bounds for the controls, respectively, and $\dot{\zeta}_{min}$ and $\dot{\zeta}_{max}$ are arrays of constant lower and upper bounds on the rates of the control, respectively.

In an exemplary embodiment, the cost functional in equation (1) above consists of a plurality of terms. A first term helps match the vehicle's state trajectory to the reference state trajectory associated with the planned trajectory. A second term is a stabilizing term that helps insure that the vehicle's control trajectory is matched to the reference control trajectory associated with the planned trajectory. A third term reduces control effort. A fourth term minimizes the slack variables. A final term in the cost functional penalizes changes in acceleration.

With continued reference to the method 400 of FIG. 4, the method 400 may proceed to block 408, wherein the method 400 may include analyzing dynamic constraints and the control signals to determine autonomous commands to follow the planned trajectory. As discussed above, upon receiving the vehicle dynamic data, the data reception module 120 may be configured to communicate the vehicle dynamic data to the trajectory follower module 124. The trajectory follower module 124 may be configured to determine dynamic constraints of the vehicle 102 based on the vehicle dynamic data. The dynamic constraints may pertain to static forbidden regions of state-time space that are based on the dynamic operation of the vehicle 102. For example, the dynamic constraints may pertain to physical constraints that may be placed upon the dynamic operation of the vehicle 102 that may be based on the real-time speed, acceleration, turning angle, and the like of the vehicle 102 as its traveling within the dynamic environment.

In one embodiment, the dynamic constraints in Equation 2 above are defined using the kinematic vehicle model in Equation 7 as $$\dot{x}(t) = u_x(t) \cos\left(\psi(t) + \tan\left(\frac{l_a \tan(\delta_f(t))}{l_a + l_b}\right)^{-1}\right) \quad (7)$$

-continued $$\dot{y}(t) = u_x(t) \sin\left(\psi(t) + \tan\left(\frac{l_a \tan(\delta_f(t))}{l_a + l_b}\right)^{-1}\right)$$

$$\dot{\psi}(t) = \frac{u_x(t) \sin\left(\tan\left(\frac{l_a \tan(\delta_f(t))}{l_a + l_b}\right)^{-1}\right)}{l_b}$$

$$\dot{u}_x(t) = a_x(t)$$

where, $\delta_f$ is the steering angle, e.g., sa, $\psi(t)$ is the yaw angle, $l_a$ and $l_b$ are the wheelbase distances of the vehicle 102.

In one embodiment, the trajectory follower module 124 may thereby analyze the control sent to complete the trajectory follower function 208 along with the dynamic constraints of the vehicle 102 and may output autonomous commands that are to be utilized to autonomously control the vehicle 102 to complete acceleration, braking, and/or steering based on its dynamic constraints in a way that minimizes control efforts and a time to reach the goal 202 while following the planned trajectory.

The method 400 may proceed to block 410, wherein the method 400 may include communicating with the ECU 104 of the vehicle 102 to autonomously control the operation of the vehicle 102 to follow the planned trajectory to reach its goal 202. In one embodiment, upon outputting autonomous commands to autonomously control the vehicle 102, the trajectory follower module 124 may communicate respective data to the autonomous control module 126. In one embodiment, the autonomous control module 126 may be configured to execute the autonomous control commands to autonomously control the vehicle 102. In particular, upon execution of the autonomous control commands, the autonomous control module 126 may communicate the autonomous control commands to the vehicle autonomous controller 116 of the vehicle 102.

The vehicle autonomous controller 116 may thereby operably control the vehicle systems/control units 118 of the vehicle 102 to autonomously operate the vehicle 102 according to the autonomous control commands to follow the planned trajectory of the vehicle 102. In particular, the vehicle 102 may be operably controlled to autonomously operate (e.g., with the application of a particular speed, acceleration, steering angle, throttle angle, braking force, etc.) according to the autonomous control commands that adhere to dynamic constraints of the vehicle 102 to reach a location of the goal 202 without overlap with static obstacles and dynamic obstacles while simultaneously optimizing speed and steering, minimizing control effort associated with autonomous dynamic parameters of the vehicle 102, and minimize a time to reach the goal 202.

Figure 5:
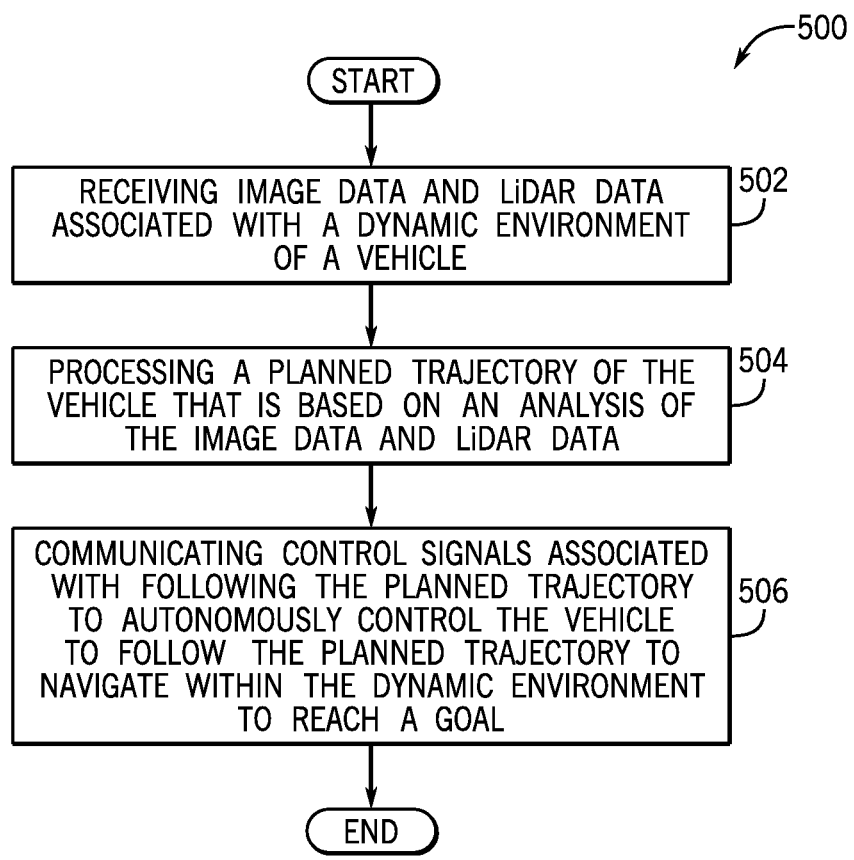
FIG. 5 is a process flow diagram of a method for providing accurate trajectory following for automated vehicles in dynamic environments according to an exemplary embodiment of the present disclosure.

FIG. 5 is a process flow diagram of a method 500 for providing accurate trajectory following for automated vehicles in dynamic environments according to an exemplary embodiment of the present disclosure. FIG. 5 will be described with reference to the components of FIG. 1 and FIG. 2 though it is to be appreciated that the method 500 of FIG. 5 may be used with other systems/components. The method 500 may begin at block 502, wherein the method 500 may include receiving image data and LiDAR data associated with a dynamic environment of a vehicle 102.

The method 500 may proceed to block 504, wherein the method 500 may include processing a planned trajectory of the vehicle 102 that is based on an analysis of the image data and LiDAR data. The method 500 may proceed to block 506, wherein the method 500 may include communicating control signals associated with following the planned trajectory to autonomously control the vehicle to follow the planned trajectory to navigate within the dynamic environment of the ego agent to reach a goal 202. A predictive optimal control problem is executed to determine the control signals that are to be communicated to autonomously control the vehicle to follow the planned trajectory.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing accurate trajectory following for automated vehicles in dynamic environments comprising:
receiving image data and LiDAR data associated with a dynamic environment of a vehicle;
processing a planned trajectory of the vehicle that is based on an analysis of the image data and LiDAR data; and
communicating control signals associated with following the planned trajectory and autonomously controlling the vehicle to follow the planned trajectory to navigate within the dynamic environment to reach a goal based on the control signals, wherein a predictive optimal control problem is executed to determine the control signals that are to be communicated to autonomously control the vehicle to follow the planned trajectory, while minimizing a time to reach the goal, wherein a prediction horizon of the predictive optimal control problem is used to set a longer prediction horizon associated with processing the planned trajectory such that the longer prediction horizon associated with processing the planned trajectory is longer than the prediction horizon of the predictive optimal control problem,
wherein the predictive optimal control problem determines the control signals based on a current trajectory state and a next trajectory state of the planned trajectory and further based at least in part on an associated control trajectory state determined in conjunction with the planned trajectory prior to execution of the predictive optimal control problem, wherein the associated control trajectory state operates as a constant reference control trajectory between trajectory states providing a fixed reference for determining the control signals that guide the vehicle from the current trajectory state to the next trajectory state, and wherein the predictive optimal control problem determines the control signals to follow the planned trajectory within the dynamic environment based at least in part on one or more of a width of the vehicle, a height of the vehicle, a weight of the vehicle, and a current transmission gear of the vehicle.

2. The computer-implemented method of claim 1, further including electronically analyzing the image data and the LiDAR data to determine data points that correspond to at least one object that is located within the dynamic environment that are captured at simultaneous time steps and aggregating the image data and the LiDAR data to determine positions of obstacles that are located within the dynamic environment.

3. The computer-implemented method of claim 2, further including classifying the obstacles that are located within the dynamic environment and that are located within a pathway on which the vehicle is traveling as dynamic obstacles and static obstacles.

4. The computer-implemented method of claim 2, wherein a location of the obstacles, a distance of the obstacles with respect to a position of the vehicle, a configuration of a pathway on which the vehicle is traveling, and a location of the goal with reference to the vehicle are analyzed to process the planned trajectory of the vehicle.

5. The computer-implemented method of claim 2, wherein the planned trajectory accounts for vehicle kinematics and simultaneously optimizes a speed of the vehicle and a steering of the vehicle to reach the goal without overlap with the positions of obstacles that are located within the dynamic environment.

6. The computer-implemented method of claim 1, wherein communicating the control signals associated with following the planned trajectory includes providing reference trajectories associated with the planned trajectory, wherein the reference trajectories are provided at evenly spaced points to generate reference trajectory matrices for a state and a control.

7. The computer-implemented method of claim 1, wherein communicating the control signals associated with following the planned trajectory includes incorporating both a planned state and control trajectories into a cost functional of the predictive optimal control problem, wherein the planned state and control trajectories are each computed independently in conjunction with the planned trajectory, and the cost functional includes a plurality of terms including a first term for matching a state trajectory of the vehicle to a reference state trajectory of the vehicle associated with the planned trajectory, a second term for stabilizing a control trajectory of the vehicle to match a reference control trajectory of the vehicle associated with the planned trajectory, a third term for reducing a control effort associated with autonomous driving parameters of the vehicle, a fourth term for minimizing slack variables, and a fifth term for penalizing changes in acceleration.

8. The computer-implemented method of claim 1, further including analyzing dynamic constraints of the vehicle and the control signals to determine autonomous commands to follow the planned trajectory, wherein the dynamic constraints pertain to static forbidden regions of state-time space that are based on a dynamic operation of the vehicle.

9. The computer-implemented method of claim 8, wherein autonomously controlling the vehicle to follow the planned trajectory includes operating the vehicle according to the control signals that are to be communicated to autonomously control the vehicle while adhering to the dynamic constraints of the vehicle to reach a location of the goal without overlap with static obstacles and dynamic obstacles while simultaneously optimizing speed and steering, and minimizing the time to reach the goal.

10. A system for providing accurate trajectory following for automated vehicles in dynamic environments comprising:

a processor and a non-transitory machine-readable storage medium that stores instructions that are executed by the processor to cause the processor to:

receive image data from a vehicle camera system and LiDAR data from a vehicle LiDAR system associated with a dynamic environment of a vehicle;

process a planned trajectory of the vehicle that is based on an analysis of the image data and LiDAR data; and communicate control signals to a vehicle autonomous controller of the vehicle, wherein the control signals are associated with following the planned trajectory and the vehicle is autonomously controlled to follow the planned trajectory to navigate within the dynamic environment to reach a goal based on the control signals, wherein a predictive optimal control problem is executed to determine the control signals that are to be communicated to the vehicle autonomous controller to autonomously control the vehicle to follow the planned trajectory, while minimizing a time to reach the goal, wherein a prediction horizon of the predictive optimal control problem is used to set a longer prediction horizon associated with processing the planned trajectory such that the longer prediction horizon associated with processing the planned trajectory is longer than the prediction horizon of the predictive optimal control problem, wherein the predictive optimal control problem determines the control signals based on a current trajectory state and a next trajectory state of the planned trajectory and further based at least in part on an associated control trajectory state determined in conjunction with the planned trajectory prior to execution of the predictive optimal control problem, wherein the associated control trajectory state operates as a constant reference control trajectory between trajectory states providing a fixed reference for determining the control signals that guide the vehicle from the current trajectory state to the next trajectory state, and wherein the predictive optimal control problem determines the control signals to follow the planned trajectory within the dynamic environment based at least in part on one or more of a width of the vehicle, a height of the vehicle, a weight of the vehicle, and a current transmission gear of the vehicle.

11. The system of claim 10, wherein the instructions further cause the processor to electronically analyze the image data and the LiDAR data to determine data points that correspond to at least one object that is located within the dynamic environment that are captured at simultaneous time steps and aggregate the image data and the LiDAR data to determine positions of obstacles that are located within the dynamic environment.

12. The system of claim 11, wherein the instructions further cause the processor to classify the obstacles that are located within the dynamic environment and that are located within a pathway on which the vehicle is traveling as dynamic obstacles and static obstacles.

13. The system of claim 11, wherein the instructions cause the processor to analyze a location of the obstacles, a distance of the obstacles with respect to a position of the vehicle, a configuration of a pathway on which the vehicle is traveling, and a location of the goal with reference to the vehicle to process the planned trajectory of the vehicle.

14. The system of claim 11, wherein the planned trajectory accounts for vehicle kinematics and simultaneously optimizes a speed of the vehicle and a steering of the vehicle to reach the goal without overlap with the positions of obstacles that are located within the dynamic environment.

15. The system of claim 10, wherein the instructions cause the processor to provide reference trajectories associated with the planned trajectory, wherein the reference trajectories are provided at evenly spaced points to generate reference trajectory matrices for a state and a control.

16. The system of claim 10, wherein the instructions cause the processor to incorporate both a planned state and control trajectories into a cost functional of the predictive optimal control problem, wherein the planned state and control trajectories are each computed independently in conjunction with the planned trajectory, and
the cost functional includes a plurality of terms including a first term for matching a state trajectory of the vehicle to a reference state trajectory of the vehicle associated with the planned trajectory, a second term for stabilizing a control trajectory of the vehicle to match a reference control trajectory of the vehicle associated with the planned trajectory, a third term for reducing a control effort associated with autonomous driving parameters of the vehicle, a fourth term for minimizing slack variables, and a fifth term for penalizing changes in acceleration.

17. The system of claim 10, wherein the instructions further cause the processor to analyze dynamic constraints of the vehicle and the control signals to determine autonomous commands to follow the planned trajectory, wherein the dynamic constraints pertain to static forbidden regions of state-time space that are based on a dynamic operation of the vehicle.

18. The system of claim 17, wherein the vehicle autonomous controller is configured to operate the vehicle according to the control signals that are to be communicated to autonomously control the vehicle while adhering to the dynamic constraints of the vehicle to reach a location of the goal without overlap with static obstacles and dynamic obstacles while simultaneously optimizing speed and steering, and minimizing the time to reach the goal.

19. A non-transitory computer readable storage medium storing instructions that when executed by a computer, which includes a processor to perform a method, the method comprising:
receiving image data and LiDAR data associated with a dynamic environment of a vehicle;
processing a planned trajectory of the vehicle that is based on an analysis of the image data and LiDAR data; and
communicating control signals associated with following the planned trajectory and autonomously controlling the vehicle to follow the planned trajectory to navigate within the dynamic environment to reach a goal based on the control signals, wherein a predictive optimal control problem is executed to determine the control signals that are to be communicated to autonomously control the vehicle to follow the planned trajectory, while minimizing a time to reach the goal, wherein a prediction horizon of the predictive optimal control problem is used to set a longer prediction horizon associated with processing the planned trajectory such that the longer prediction horizon associated with processing the planned trajectory is longer than the prediction horizon of the predictive optimal control problem,
wherein the predictive optimal control problem determines the control signals based on a current trajectory state and a next trajectory state of the planned trajectory and further based at least in part on an associated control trajectory state determined in conjunction with the planned trajectory prior to execution of the predictive optimal control problem,
wherein the associated control trajectory state operates as a constant reference control trajectory between trajectory states providing a fixed reference for determining the control signals that guide the vehicle from the current trajectory state to the next trajectory state, and
wherein the predictive optimal control problem determines the control signals to follow the planned trajectory within the dynamic environment based at least in part on one or more of a width of the vehicle, a height of the vehicle, a weight of the vehicle, and a current transmission gear of the vehicle.

20. The non-transitory computer readable storage medium of claim 19, wherein autonomously controlling the vehicle to follow the planned trajectory includes operating the vehicle according to control signals that are to be communicated to autonomously control the vehicle while adhering to dynamic constraints of the vehicle to reach a location of the goal without overlap with static obstacles and dynamic obstacles while simultaneously optimizing speed and steering, and minimizing the time to reach the goal.

* * * * *